United States Patent [19]

Wallace

[11] Patent Number: 4,922,783
[45] Date of Patent: May 8, 1990

[54] CABLE CLAMPING APPARATUS

[76] Inventor: Dennis W. Wallace, 8853 Tiber Street, Ventura, Calif. 93004

[21] Appl. No.: 235,911

[22] Filed: Aug. 23, 1988

[51] Int. Cl.$^5$ .......................... F16C 1/10; E05F 11/48
[52] U.S. Cl. .................................... 74/502.4; 49/352; 403/406.1
[58] Field of Search ................. 74/500.5, 502.4, 502.6; 49/352; 403/406.1, 405.1, 397; 411/174, 175, 112

[56] References Cited

U.S. PATENT DOCUMENTS

| | | | |
|---|---|---|---|
| 2,215,373 | 9/1940 | Krakauer et al. | 403/405.1 X |
| 3,806,994 | 4/1974 | Lankford | 403/397 |
| 3,890,743 | 6/1975 | Eckhardt et al. | 49/352 |
| 4,494,336 | 1/1985 | Ishii et al. | 49/352 |
| 4,759,653 | 6/1988 | Maekawa et al. | 49/352 |
| 4,823,512 | 4/1989 | Maekawa et al. | 49/352 |

OTHER PUBLICATIONS

Catalog from Erico Products Inc.

Primary Examiner—Gary L. Smith
Assistant Examiner—F. Saether
Attorney, Agent, or Firm—William J. Benman, Jr.

[57] ABSTRACT

An improved cable clamping apparatus is disclosed. The apparatus is adapted for use in a cable actuated power drive mechanism having a cable and a cable drive mechanism. In a preferred embodiment, the improved cable clamping apparatus includes a coupling element for moving a mass in response to the movement of the cable. A particularly novel aspect of the invention is the provision of a cable clamp attached to the coupling element for clamping the cable such that the coupling element moves in response to the movement of the cable. The cable clamp is generally L-shaped with an integral first section and dual U-shaped second sections each adapted to receive the cable therein. In a specific embodiment, the dual U-shaped sections of the clamp are separated to receive and retain a cable collar therebetween. In a further more specific embodiment, at least one U-shaped section of the clamp is adapted for fastening with an appropriate fastener to enclose a portion of the cable therein.

1 Claim, 2 Drawing Sheets

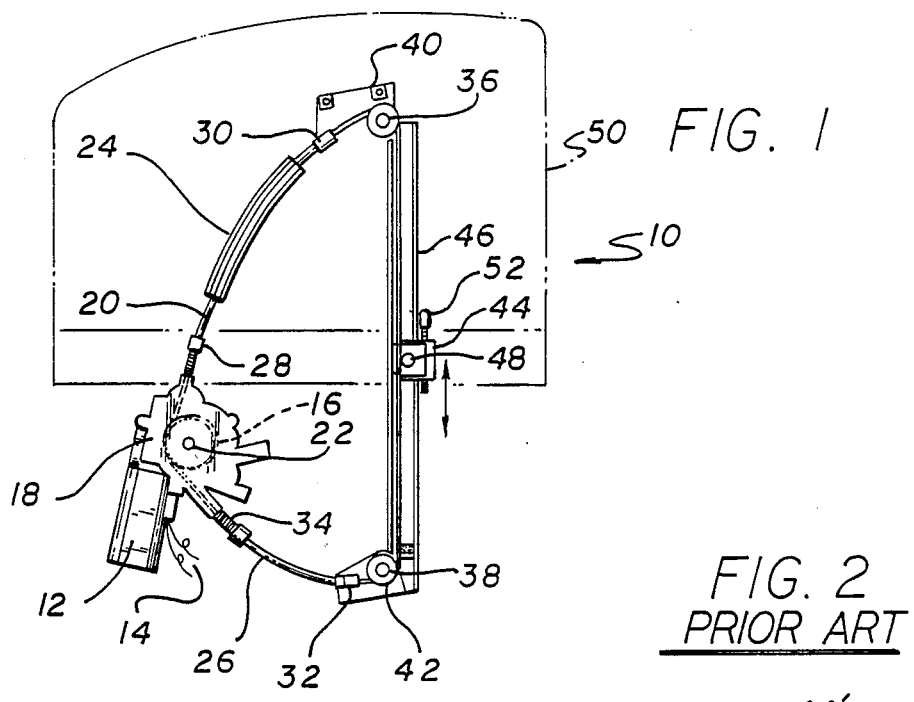
FIG. 1
FIG. 2 PRIOR ART
FIG. 3 PRIOR ART
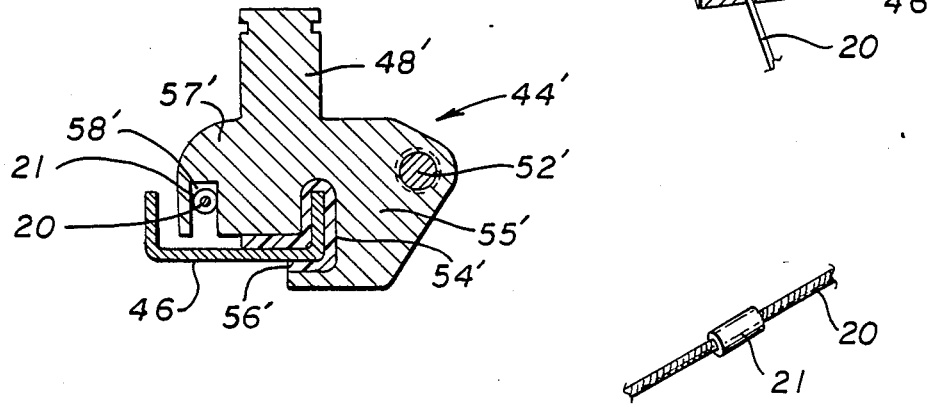
FIG. 4

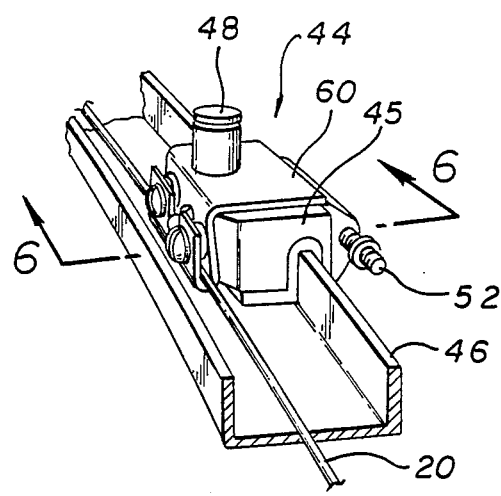
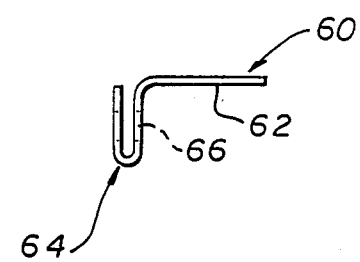
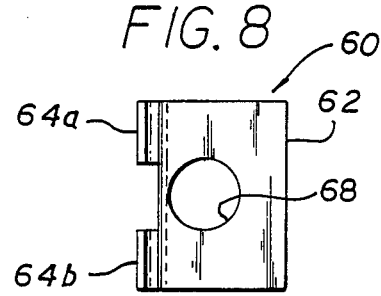
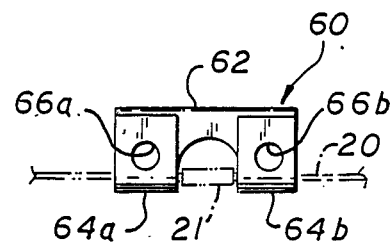
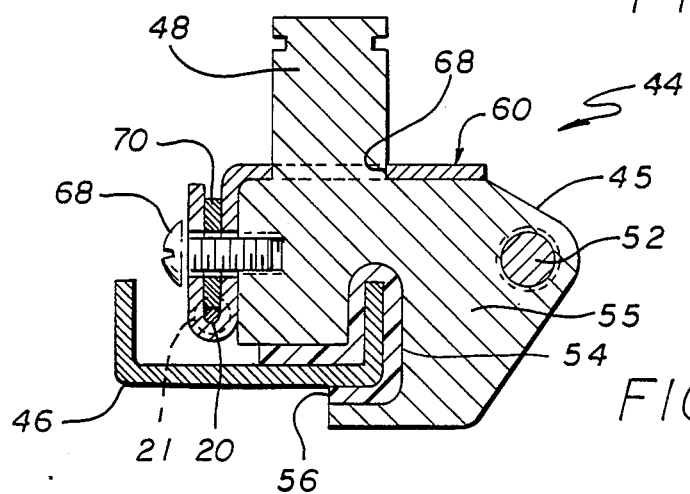

CABLE CLAMPING APPARATUS

BACKGROUND OF THE INVENTION

1. Field of the Invention

The present invention relates to drive mechanisms. More specifically, the present invention relates to drive mechanisms for the power windows automobiles, trucks and other passenger vehicles.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

Many techniques are known in the art for driving a power window of an automobile, truck or other passenger vehicle. One such technique involves the use of a flexible cable which is wrapped around a power driven spool. A coupling element is mounted on a track and clamped to the cable. The window sits on the coupling element. When the drive mechanism is activated, the cable pulls the coupling element along the track and thereby translates the position of the window.

In some conventional of this scheme, the cable is merely gripped by the coupling element. In many cases, the grip of the coupling element on the cable may loosen over time. This results in a total failure of the power window drive mechanism.

Accordingly, there is a need in the art for an improved cable-actuated power window drive mechanism. More specifically, there is a need in the art for an improved cable clamp apparatus for use in such power window drive mechanisms. Ideally, the cable clamp apparatus would be suitable for retrofitting the cable-actuated power drive mechanisms already in service.

SUMMARY OF THE INVENTION

The need in the art is addressed by the improved cable clamping apparatus of the present invention. The apparatus is adapted for use in a cable actuated power drive mechanism having a cable and a cable drive mechanism. In a preferred embodiment, the improved cable clamping apparatus includes a coupling element for moving a mass in response to the movement of the cable. A particularly novel aspect of the invention is the provision of a cable clamp attached to the coupling element for clamping the cable such that the coupling element moves in response to the movement of the cable. The cable clamp is generally L-shaped with an integral first section and dual U-shaped second sections each adapted to receive the cable therein. In a specific embodiment, the dual U-shaped sections of the clamp are separated to receive and retain a cable collar therebetween. In a further more specific embodiment, at least one U-shaped section of the clamp is adapted for fastening with an appropriate fastener to enclose a portion of the cable therein.

BRIEF DESCRIPTION OF THE INVENTION

FIG. 1 is a side elevational view of a cable actuated power, drive mechanism with a window shown in phantom.

FIG. 2 is a perspective view of a conventional cable clamp apparatus for a cable actuated power drive mechanism.

FIG. 3 shows a sectional side view of the conventional cable clamp apparatus of FIG. 2.

FIG. 4 shows a cable with an annular cable collar.

FIG. 5 shows a perspective view of a preferred embodiment of the cable clamp apparatus of the present invention.

FIG. 6 is a sectional side view of the preferred embodiment of the cable clamp apparatus of the present invention.

FIG. 7 is a side elevational view of the cable clamp element of the cable clamp apparatus of the present invention.

FIG. 8 is a top view of the cable clamp element of the cable clamp apparatus of the present invention.

FIG. 9 is a rear elevational view of the cable clamp element of the cable clamp apparatus of the present invention with the cable and cable collar shown in phantom.

DESCRIPTION OF THE INVENTION

A cable actuated power drive mechanism 10 is illustrated in FIG. 1. The mechanism 10 includes an electrical motor 12 having wires 14. The wires 14 are typically connected to a source of electrical energy (not shown) via a switch (not shown). As is known in the art, the motor 12 drives a spool 16 (shown in phantom) encased within a housing 18. A cable 20 is connected at both ends or wrapped about the spool 16. The spool 16 is capable of bi-directional rotation about an axle 22. The cable 20 is fabricated of flexible yet strong material such as stranded wire, plastic or other suitable material. The cable 20 is protected by rubber hoses 24 and 26. The cable 20 is constrained in a loop by a number of guides 28, 30, 32 and 34. Between a pair of guide rollers 36 and 38 suspended from a frame (not shown) via corresponding brackets 40 and 42 respectively, the cable is substantially straight and connected to a coupling element 44. The coupling element 44 is mounted on a track 46 for translational movement in response to the movement of the cable 20. In a power window system, the coupling element 44 is attached to a window 50 (shown in phantom) at a protrusion 48. A stop 52 extends through the coupling element 44. The stop 52 is in threaded engagement with the coupling element 44 and is therefore adjustable to allow the range of motion of the coupling element 44 to be adjusted. The stop 52 may have a rubber or plastic tip as is known in the art. The manner in which the coupling element 44 engages the cable 20 is the subject of the present invention.

A conventional coupling element 44' is shown in FIGS. 2 and 3. FIG. 2 shows the conventional coupling element 44' seated on a track 46 in operative engagement of the cable 20. As shown in FIG. 4, the diameter of the cable 20 is extended by a an annular metallic collar 21 which extends longitudinally over a small portion thereof. The method by which the conventional coupling element 44' operates is best illustrated with reference to the cross-sectional view of FIG. 3. Note that the element 44' has a recess 54' within a lip 57' off the main body 55' thereof which is coated with plastic 56' or other suitable lubricating spacing material The recess 54' serves to receive the track 46. The spacing material assists in the maintenance of the proper orientation of the element 44' relative to the track 46. The main body of the coupling element 55' includes a second recess 58' which is adapted to receive and grip the cable 20 at the collar 21 thereof. Unfortunately, as is known in the art, over a period of time, the grip of the recess 58' on the collar 21 begins to loosen. When this occurs, it often leads to a catastrophic failure of the entire power drive mechanism 10.

FIGS. 5-9 illustrate the preferred embodiment of the cable clamp apparatus 44 of the present invention which is designed to overcome the above-noted problems besetting the coupling element 44' of the related art. FIG. 5 shows, in a perspective view, the cable clamp apparatus 44 of the present invention. It includes a coupling element 45 and a cable clamp 60. The coupling element 45 is mounted on a track 46 in operative engagement with a cable 20. As shown in the cross-sectional view of FIG. 6, the coupling element 45 of the present invention is structurally similar to the coupling element 44' of the related art (see FIG. 3). One key difference is that the lip 57' of the coupling element 44' of the related art is not present in the coupling element 45 of the preferred embodiment. The lip 57' is removed to allow the cable clamp 60 of the present invention to seat on the coupling element 45 and perform the function of the recess 58' of the coupling element 44' of the related art. Otherwise, the coupling element 45 of the present invention is essentially identical in structure and operation to the element 44' of the related art. Hence, the cable clamp 60 constitutes a key feature of the present invention.

FIG. 7 is a side elevational view of the cable clamp 60 of the present invention. The cable clamp 60 is made of metal or other suitable material. The cable clamp 60 is generally L-shaped with an integral first section 62 and dual U-shaped second sections 64a and 64b each adapted to receive the cable 20 therein. As shown in the top view of FIG. 8, the clamp 60 includes an aperture 68 in the first section 62 which is of sufficient diameter to allow the clamp to seat over the protrusion 48 of the coupling element 45. See FIG. 6. In the rear view of FIG. 9, the relationship between the dual U-shaped second sections 64a and 64b and the cable 20 with associated collar 21 may be appreciated. Note the troughs of the U-shaped sections 64a and 64b are substantially parallel so that the cable 20 sits within each. Note, further, that in accordance with the teachings of the present invention, the collar 21 on the cable is not gripped as in the related art, but, instead, the collar 21 is held between the U-shaped sections 64a and 64b. Thus, the ability of the clamp to move the element 45 in response to the movement of the cable 20 is not dependent on the strength of the frictional grip on the collar 21.

Before returning to FIG. 6, note the provision of openings 66a and 66b in the U-shaped sections 64a and 64b respectively. These openings are provided to allow screws 68 to retain the clamp 60 in place on the coupling element 45. See FIG. 6.

As illustrated in the cross-sectional side view of FIG. 6, the screws 68 are effective to (1) hold the clamp in place on the coupling element 45; (2) to cooperate with the washers 70 to retain the cable within the troughs of the U-shaped sections 64a and 64b; and (3) to act as a fastener and vary the extent to which the cable 20 is squeezed by the U-shaped sections 64a and 64b. This third feature adds additional security to the clamping action provided by the clamp 60 of the present invention and ensures against a failure which might otherwise result from a loosening of the collar 21 on the cable 20.

Thus, the present invention has been described herein with reference to a particular embodiment for a particular application. Those of ordinary skill in the art having access to the teachings provided herein will recognize additional modifications, applications, and embodiments within the scope thereof. For example, other fastener means may be used other than the screws 68 without departing from the scope of the present invention. Further, the invention may be used for applications other than power windows.

It is therefore intended by the appended claims to cover any and all such applications, modifications, and embodiments.

Accordingly,

What is claimed is:

1. An improved cable clamping apparatus for use in a cable actuated power drive mechanism having a cable, said cable having a collar along a portion thereof, and a cable drive mechanism, said improved cable clamping apparatus comprising:

coupling means for moving a mass in response to the movement of said cable and cable clamp means attached to said coupling means for clamping said cable whereby said coupling means moves in response to the movement of said cable, said cable clamp means being generally L-shaped with an integral first section and dual U-shaped second sections each adapted to receive said cable therein, said dual U-shaped sections of said clamp means being separated to receive and retain said cable collar therebetween and at least one U-shaped section being adapted to cooperate with fastener means for enclosing a portion of said cable in said U-shaped section, said cable clamp means further including an aperture for receiving a protrusion from said coupling means to facilitate the attachment of said cable clamp means to said coupling means.

* * * * *